US010334527B2

(12) United States Patent
Kumar et al.

(10) Patent No.: US 10,334,527 B2
(45) Date of Patent: Jun. 25, 2019

(54) METHOD AND/OR SYSTEM FOR SCHEDULING MULTIPLE RECEIVE CHAINS

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 15/675,495

(22) Filed: Aug. 11, 2017

(65) Prior Publication Data

US 2019/0053158 A1   Feb. 14, 2019

(51) Int. Cl.
| | |
|---|---|
| *H04B 1/38* | (2015.01) |
| *H04W 52/02* | (2009.01) |
| *H04W 76/28* | (2018.01) |
| *H04B 7/0413* | (2017.01) |
| *H04W 88/02* | (2009.01) |

(52) U.S. Cl.
CPC ..... *H04W 52/0225* (2013.01); *H04W 52/028* (2013.01); *H04W 52/0229* (2013.01); *H04B 7/0413* (2013.01); *H04W 76/28* (2018.02); *H04W 88/02* (2013.01)

(58) Field of Classification Search
CPC ......... H04W 52/0225; H04W 52/0229; H04W 52/028

See application file for complete search history.

(56) References Cited

U.S. PATENT DOCUMENTS

| | | | |
|---|---|---|---|
| 2012/0120860 A1 | 5/2012 | Chui et al. | |
| 2013/0190006 A1* | 7/2013 | Kazmi | H04W 64/006 455/456.1 |
| 2014/0098754 A1* | 4/2014 | Luo | H04L 5/0053 370/329 |
| 2014/0120947 A1* | 5/2014 | Siomina | G01S 5/0221 455/456.1 |

(Continued)

FOREIGN PATENT DOCUMENTS

| | | |
|---|---|---|
| WO | 2012128793 A1 | 9/2012 |
| WO | WO-2012128793 A1 | 9/2012 |

(Continued)

OTHER PUBLICATIONS

International Search Report and Written Opinion—PCT/US2018/045300—ISA/EPO—dated Oct. 22, 2018.

*Primary Examiner* — MD K Talukder
(74) *Attorney, Agent, or Firm* — Hunter Clark PLLC

(57) ABSTRACT

Disclosed are devices and processes for processing portions of a downlink signal using multiple receive chains. In one implementation, while message traffic is received at two or more receive chains of a receiver device, an inactivity timing may be initiated following a most recent activity event at the receiver device. Responsive to a request to acquire a portion of a downlink signal at the receiver device following initiation of the inactivity timer, at least one of the two or more receive chains may be scheduled to acquire the portion of the downlink signal. Other, unscheduled receive chains may be transitioned to a lower power state upon expiration of the inactivity timer.

27 Claims, 8 Drawing Sheets

(56) References Cited

U.S. PATENT DOCUMENTS

| | | | |
|---|---|---|---|
| 2015/0189666 A1* | 7/2015 | Wang | H04W 72/1226 |
| | | | 370/329 |
| 2015/0271755 A1* | 9/2015 | Karri | H04W 52/0229 |
| | | | 370/252 |
| 2015/0282076 A1* | 10/2015 | Larmo | H04W 52/0209 |
| | | | 370/311 |
| 2015/0373566 A1 | 12/2015 | Pius et al. | |
| 2016/0205499 A1 | 7/2016 | Davydov et al. | |
| 2016/0219475 A1 | 7/2016 | Kim et al. | |
| 2017/0019919 A1 | 1/2017 | Liang et al. | |
| 2017/0201420 A1* | 7/2017 | Chen | H04B 7/0877 |
| 2018/0027424 A1* | 1/2018 | Chen | H04W 76/28 |
| | | | 455/450 |

FOREIGN PATENT DOCUMENTS

| | | |
|---|---|---|
| WO | WO-2016166182 A1 | 10/2016 |
| WO | WO-2016191916 A1 | 12/2016 |

\* cited by examiner

ND/OR SYSTEM FOR
SCHEDULING MULTIPLE RECEIVE
CHAINS

BACKGROUND

Field

Subject matter disclosed herein relates to scheduling of receive chains in a mobile device.

Information:

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). In particular implementations, a mobile device may enter a low power mode following an elapsed duration of inactivity in a connected DRX (C-DRX) mode.

SUMMARY

Briefly, one particular implementation is directed to a method at a mobile device comprising: receiving message traffic at two or more receive chains of a receiver device; initiating an inactivity timer following a most recent activity event at the receiver; receiving a request to perform measurement of an aspect of a downlink signal at the receiver device following initiation of the inactivity timer; and scheduling at least one of the two or more receive chains to measure the aspect of the downlink signal while transitioning other unscheduled receive chains to a lower power state upon expiration of the inactivity timer.

Another particular implementation is directed to a mobile device, comprising: a receiver device comprising two or more receive chains; and one or more processors configured to: initiate an inactivity timer following a most recent activity event at the receiver; detect a request to perform measurement of an aspect of a downlink signal at the receiver device following initiation of the inactivity timer; and schedule at least one of the two or more receive chains to measure the aspect of the downlink signal while transitioning other unscheduled receive chains to a lower power state upon expiration of the inactivity timer.

Another particular implementation is directed to a non-transitory storage medium comprising computer-readable instructions stored thereon which are executable by a process of a mobile device to: obtain message traffic received at two or more receive chains of a receiver device; initiate an inactivity timer following a most recent activity event at the receiver device; detect a request to perform measurement of an aspect of a downlink signal at the receiver device following initiation of the inactivity timer; and schedule at least one of the two or more receive chains to measure the aspect of the downlink signal while transitioning other unscheduled receive chains to a lower power state upon expiration of the inactivity timer.

Another particular implementation is directed to a mobile device, comprising: means for receiving message traffic at two or more receive chains of a receiver device; means for initiating an inactivity timer following a most recent activity event at the receiver; means for receiving a request to perform measurement of an aspect of a downlink signal at the receiver device following initiation of the inactivity timer; and means for scheduling at least one of the two or more receive chains to measure the aspect of the downlink signal while transitioning other unscheduled receive chains to a lower power state upon expiration of the inactivity timer.

Another particular implementation is directed to a method, at a mobile device, comprising: acquiring one or more downlink signals at two or more antenna elements of a multiple input, multiple output (MIMO) antenna system; determining time of arrival (TOA) measurements for acquisitions of the one or more downlink signals at the two or more antenna elements individually; and combining TOA measurements for determining a combined TOA measurement for positioning operations.

Another particular implementation is directed to a mobile device, comprising: a receiver device comprising a plurality of receive chains coupled to a multiple input, multiple output (MIMO) antenna system; and one or more processors configured to: determine time of arrival (TOA) measurements for acquisitions of the one or more downlink signals at the two or more antenna elements individually; and combine TOA measurements for determining a combined TOA measurement for positioning operations.

Another particular implementation is directed to a non-transitory storage medium comprising computer-readable instructions stored thereon which are executable by a processor of a mobile device to: determine time of arrival (TOA) measurements for one or more downlink signals acquired individually at two or more antenna elements of a multiple input, multiple output (MIMO) antenna system; and combine TOA measurements for determining a combined TOA measurement for positioning operations.

Another particular implementation is directed to a mobile device comprising: means for acquiring one or more downlink signals at two or more antenna elements of a multiple input, multiple output (MIMO) antenna system; means for determining time of arrival (TOA) measurements for acquisitions of the one or more downlink signals at the two or more antenna elements individually; and means for combining TOA measurements for determining a combined TOA measurement for positioning operations.

Another particular implementation is directed to a method, at a mobile device, comprising: initiating a first timer following a most recent activity event at a receiver; placing one or more receive chains of the receiver in a lower power state in response to an expiration of the first timer following a first duration; initiating a second timer responsive to a request to measure an aspect of a downlink signal at the receiver device; and transitioning at least a first receive chain of the one or more receive changes from the lower power state to a higher power state to measure the aspect of the downlink signal in response to an expiration of the second timer of a second duration.

Another particular implementation is directed to a mobile device, comprising: a receiver device comprising two or more receive chains; and one or more processors configured to: initiate a first timer following a most recent activity event at the receiver device; place one or more receive chains of the receiver in a lower power state in response to an expiration of the first timer following a first duration; initiate a second timer responsive to a request to measure an aspect of a downlink signal at the receiver device; and transition at least a first receive chain of the one or more receive chains from the lower power state to a higher power state to measure the aspect of the downlink signal in response to an expiration of the second timer of a second duration.

Another particular implementation is directed to a non-transitory storage medium comprising computer-readable instructions stored thereon which are executable by a process of a mobile device to: initiate a first timer following a most recent activity event at a receiver device of the mobile device; place one or more receive chains of the receiver device in a lower power state in response to an expiration of the first timer following a first duration; initiate a second timer responsive to a request to measure an aspect of a downlink signal at the receiver device; and transition at least a first receive chain of the one or more receive chains from the lower power state to a higher power state to measure the aspect of the downlink signal in response to an expiration of the second timer of a second duration.

Another particular implementation is directed to a mobile device, comprising: means for initiating a first timer following a most recent activity event at a receiver; means for placing one or more receive chains of the receiver in a lower power state in response to an expiration of the first timer following a first duration; means for initiating a second timer responsive to a request to measure an aspect of a downlink signal at the receiver device; and means for transitioning at least a first receive chain of the one or more receive changes from the lower power state to a higher power state to measure the aspect of the downlink signal in response to an expiration of the second timer of a second duration.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
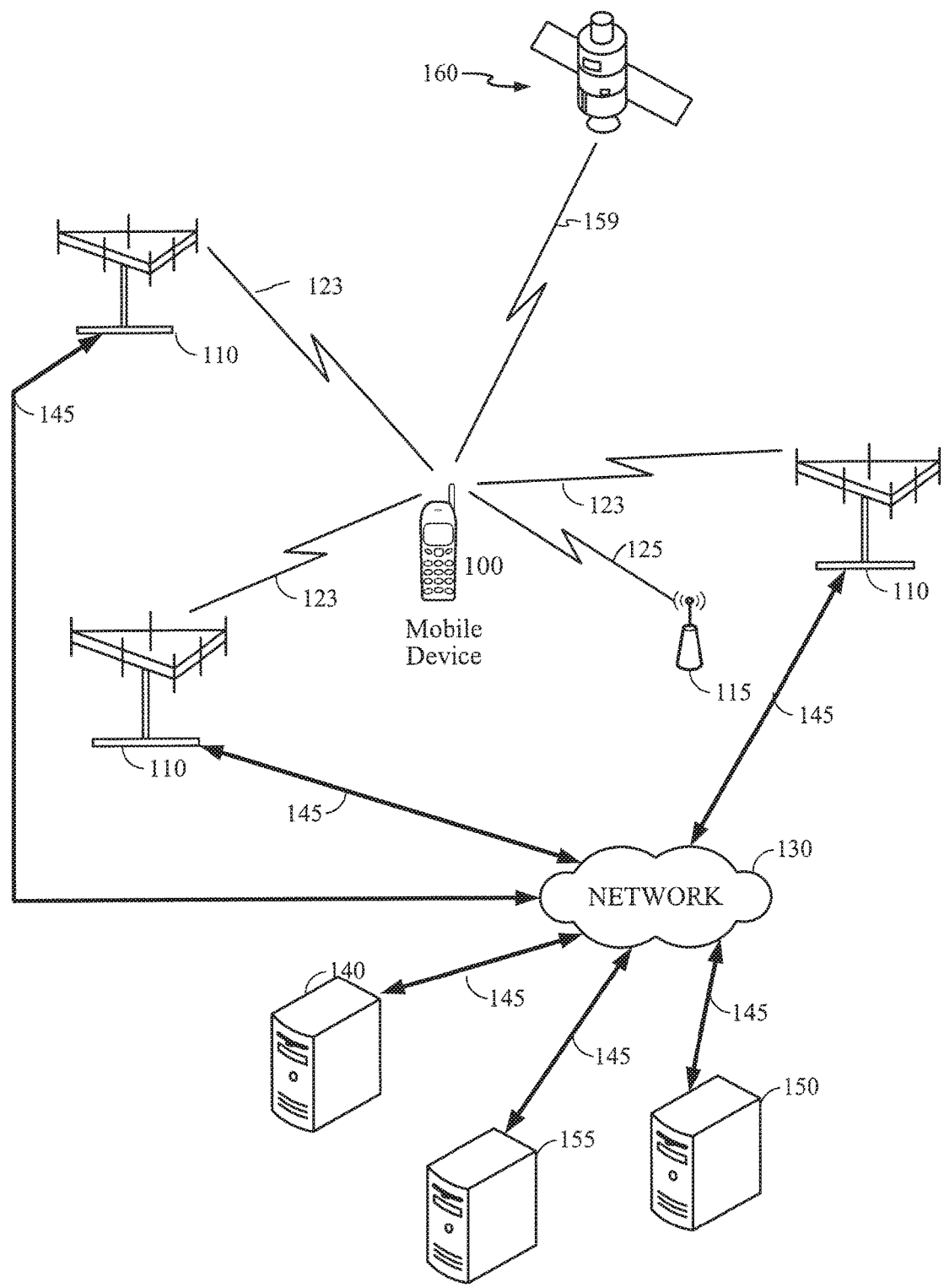
FIG. 1 is an example architecture for terrestrial positioning.

Reference is made in the following detailed description to accompanying drawings, which form a part hereof, wherein like numerals may designate like parts throughout that are identical, similar and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

According to an embodiment, observed time difference of arrival (OTDOA) positioning may be performed for different types of applications such as an E911 emergency service or other location based service (LBS) such as social media applications. In one aspect, a mobile device may receive a request to acquire a positioning reference signal (PRS) to support a request for a position fix originating at a location server (e.g., in support of an E911 service) or an active navigation application executing on an application processor of the mobile device. Responsive to such a request to acquire a PRS, the mobile device may configure its receiver to acquire one or more occasions of the PRS at a particular time (e.g., downlink subframes) and frequency band (e.g., a narrow frequency band allocated to occasions of the PRS) according to a PRS configuration.

According to an embodiment, a cellular network may implement one or more aspects of Long-term Evolution (LTE) Downlink Carrier Aggregation (DLCA). In a particular implementation, a mobile device may operate in an LTE carrier network that has implemented DLCA enabling the mobile device to receive downlink messages from multiple downlink communication channels transmitted contemporaneously by a single base station or multiple different base stations. Furthermore, a mobile device receiving a DLCA service may employ a multiple input, multiple output (MIMO) antenna system including two or more antenna elements and multiple "receive chains" to process downlink signals received at the two or more antenna elements. In this context, a "receive chain" as referred to herein means a collection of components of a device configured to process one signal or a portion of a signal independently of other components of the device configured to process the same or different signal. In an example implementation, a receive chain may comprise a combination of physical layer processing elements formed in circuity comprising an antenna element, analog filter, preamplification circuitry, analog to digital sampling circuitry, digital filters, demodulators/detectors, etc. It should be understood, however, that these are merely examples of components that may be configured to provide a receive chain, and claimed subject matter is not limited in this respect. Different receive chains may be selected or configured to process individual components of downlink signals received at antenna elements to, for example, demodulate or decode symbols in a downlink communication channel, occasions of a PRS signal, just to provide a couple of examples.

In a particular implementation, a receiver of a mobile device for processing signals to receive multiple channels of a DLCA service may consume considerable battery life for the mobile device. According to an embodiment, a mobile device may transition its receiver for processing downlink signals received in a MIMO system to a lower power or sleep state following a period of inactivity. Here, receive chains of a mobile device receiver in a lower power or sleep state may periodically "awaken" to sample a downlink in a pager mode. If the mobile device receives a request to process a downlink signal (e.g., a PRS) subsequent to initiation of the inactivity timer but before a predetermined period has elapsed, the inactivity timing may be restarted following completion of processing of the downlink signal according to the request. Unfortunately, frequent requests for acquisition of PRS occasions may prevent a mobile device from ever transitioning its receiver to the connected DRX (C-DRX) mode indefinitely, preventing advantages of associated power consumption reductions.

According to an embodiment, in response to a request to acquire a PRS occasion in a downlink signal, a mobile device using a MIMO antenna system may allow some receive chains to transition to a lower power or sleep state while scheduling other receive changes to process the PRS occasion. Accordingly, the mobile device may achieve at least some power savings associated with allowing some receive chains to transition to a lower power state. In an implementation, the mobile device may transition some receive chains to the lower power or sleep state upon expiration of an inactivity timer (e.g., transitioning to a C-DRX or C-DRX-like mode) while scheduling other receive chains to acquire the PRS occasion. Upon completion of the request to acquire the PRS occasion, the receive chains scheduled to acquire the PRS occasion may be transitioned to the lower power or sleep state.

As shown in FIG. 1 in a particular implementation, mobile device 100, which may also be referred to as a UE (or user equipment), may transmit radio signals to, and receive radio signals from, a wireless communication network. In one example, mobile device 100 may communicate with a cellular communication network by transmitting wireless signals to, or receiving wireless signals from one or more cellular transceivers 110 which may comprise a wireless base transceiver subsystem (BTS), e Node B transceiver or an evolved NodeB (eNodeB) transceiver over wireless communication links 123. Similarly, mobile device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Mobile device 100 may receive or acquire satellite positioning system (SPS) signals 159 from SPS satellites 160. In some implementations, SPS satellites 160 comprising transmitters may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In particular implementations, and/or as discussed below, mobile device 100 may have circuitry and/or processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

Examples of network technologies that may support wireless communication link 123 are Global System for Mobile Communications (GSM), Code Division Multiple Access (CDMA), Wideband CDMA (WCDMA), LTE (including DLCA), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth® (BT) and LTE.

In a particular implementation, cellular transceivers 110 and local transceiver 115 may communicate with servers 140, 150 and/or 155 over a network 130 through links 145. Here, network 130 may comprise any combination of wired or wireless links and may include cellular transceiver 110 and/or local transceiver 115 and/or servers 140, 150 and 155. In a particular implementation, network 130 may comprise Internet Protocol (IP) or other infrastructure capable of facilitating communication between mobile device 100 and servers 140, 150 or 155 through local transceiver 115 or cellular transceiver 110. In an embodiment, network 130 may also facilitate communication between mobile device 100, servers 140, 150 and/or 155. In another implementation, network 130 may comprise cellular communication network infrastructure such as, for example, a base station controller or packet based or circuit based switching center (not shown) to facilitate mobile cellular communication with mobile device 100. In a particular implementation, network 130 may comprise local area network (LAN) elements such as WiFi APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one implementation, network 130 may include one or more serving gateways or Packet Data Network gateways. In addition, one or more of servers 140, 150 and 155 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 130.

In particular implementations, and as discussed below, mobile device 100 may have circuitry and processing resources capable of obtaining location related measurements (e.g. for signals received from GPS or other Satellite Positioning System (SPS) satellites 160, cellular transceiver 110 or local transceiver 115 and possibly computing a position fix or estimated location of mobile device 100 based on these location related measurements. For example, mobile device 100 may comprise circuitry and processing capable of obtaining location related measurements from acquisition of terrestrial positioning signals such as positioning reference signals (PRSs) transmitted from a cell transceiver 110. For example, by acquiring PRSs transmitted by three cellular transceivers 110, mobile device 100 may compute a Reference Signal Time Difference (RSTD) measurement for use in obtaining a position fix.

In one embodiment, mobile device 100 may acquire PRS signals transmitted by cellular transceivers 110 responsive to requests for obtaining a position fix (e.g., to satisfy a request for a position fix originating at a navigation application or a request in response to an E911 event). In a particular implementation in which mobile device 100 comprises a MIMO antenna system with multiple receive chains, one or more receive chains may be scheduled to acquire a PRS in response to a request. In an example implementation, mobile device 100 may comprise a wireless transceiver device comprising multiple receive chains for a MIMO antenna system as discussed below with reference to FIG. 5.

Figure 2:
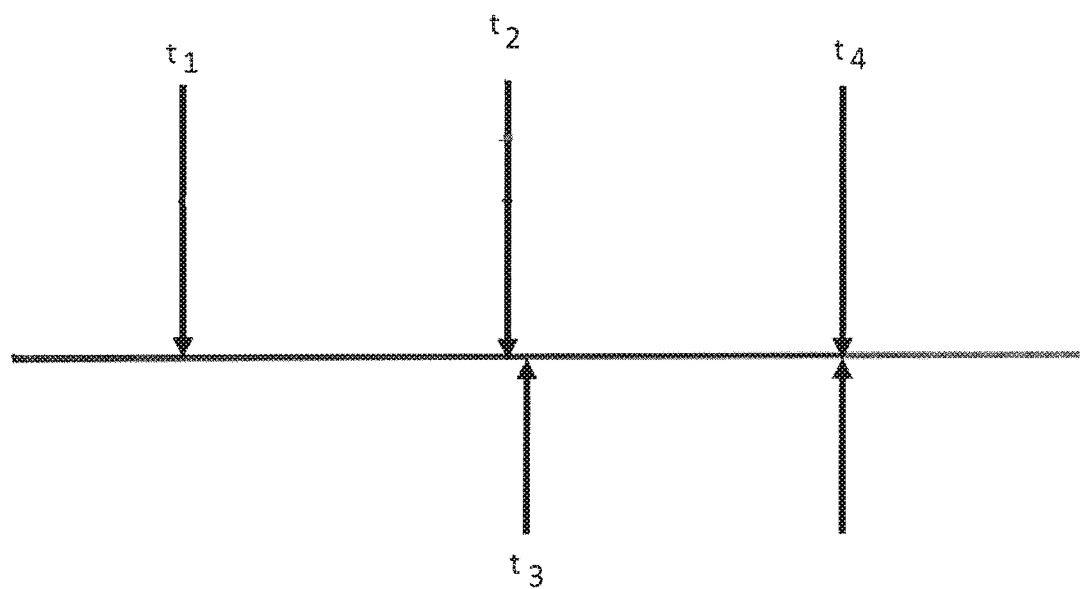
FIG. 2 is a timing diagramming illustrating a process to schedule multiple receive chains according to an example embodiment.

FIG. 2 is a timing diagram illustrating events including measurement of an aspect of a terrestrial positioning signal responsive to a request. In this particular example, a mobile device may be capable of transitioning one or more portions of its receiver to a lower power state as in a connected discontinuous reception (C-DRX) mode. According to an embodiment, following certain events, an inactivity timer may be initiated. If the inactivity timer elapses for a period without any subsequent events requesting resources from a receive chain, the mobile device may transition its receive chains to a C-DRX mode to conserve battery life. Here, a certain event occurring at time $t_1$, such decoding of a last Physical Downlink Control Channel (PDCCH) symbol received on a downlink communication channel, may initiate an inactivity timer. If the inactivity timer subsequently elapses until time $t_4$ in the absence of another such event subsequent to time $t_1$, the mobile device may transition one or more receive chains to a lower power mode. However, an intervening event at time $t_2$ (e.g., a request to acquire a PRS transmitted by a cellular base station) may prompt a resetting or reinitialization at time $t_3$ of the inactivity timer initiated at time $t_1$. For example, an intervening event at time $t_2$ may comprise a request from a higher layer process of the mobile device for a measurement of a PRS occasion to support a positioning session or request. As such, the mobile device may not transition any receive chains to a lower power mode such as a C-DRX mode as discussed above. As may be observed, if events prompting a resetting or reinitialization of the inactivity timer occur with sufficient frequency, receive chains of the mobile device may not transition to a C-DRX mode and remain at full power indefinitely.

Figure 3:
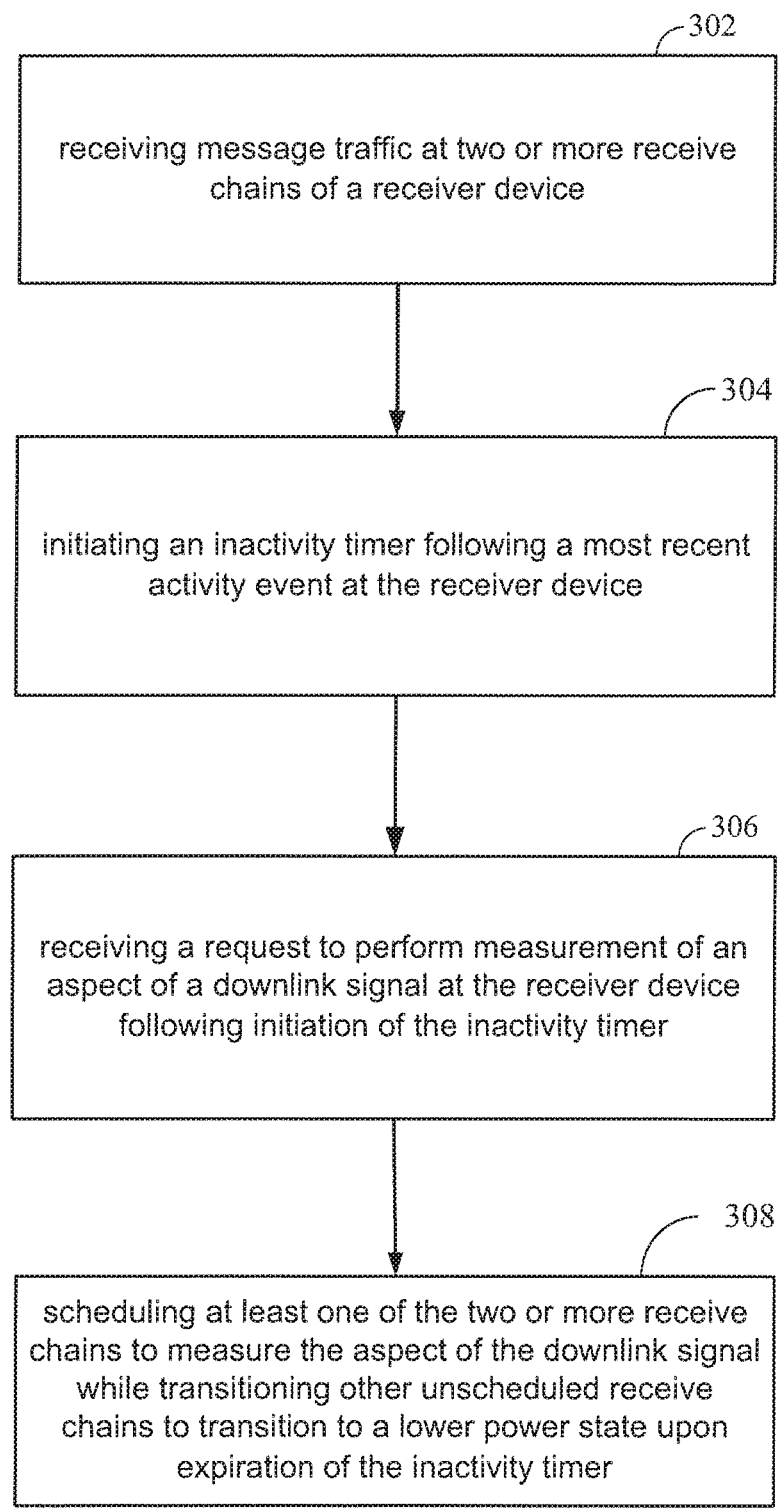
FIG. 3 is flow diagram of a process according to an example embodiment.

FIG. 3 is a flow diagram of a process for scheduling selected receive chains of a mobile device to service a request to acquire a signals while allowing other receive chains of the mobile device to transition to a lower power state. In this context, a "lower power state" as referred to herein, means an operational state of a device or portion of a device that consumes energy (e.g., stored energy as supplied from a battery) at a reduced rate as compared to a rate of energy consumption at a fully powered or operational state. For example, a device or portion of a device may be placed in or transitioned to a lower power state by removing or disconnecting particular circuits or components from a power load or otherwise powering off particular circuits or components of the device or portion of the device. In a particular example as discussed herein, one or more receive chains may be placed in a lower power mode by transitioning the one or more receive chains to a C-DRX mode of operation. Further in this context, a "higher power state" as referred to herein, means an operational state of a device or portion of a device that consumes energy at a higher rate than the device or portion of the device while operating in a lower power state. Also, such a higher power state may or may not comprise a full power state for the device or portion of the device. Continuing with the example provided above, a device or portion of a device may be placed in or transitioned to a higher power state by connecting particular additional circuits or components to a power load, or otherwise powering on particular circuits or components of the device or portion of the device. In the particular example as discussed herein, one or more receive chains may be placed in a lower power mode by transitioning the one or more receive chains from the C-DRX mode of operation to a power state that enables the one or more receive chains to process a downlink signal.

At block 302, the mobile device may be engaged in processing message traffic received in downlink signals at two or more receive chains of a receiver device of the mobile device. At block 304, the mobile device may initiate an inactivity timer following a most recent activity event at a receiver device, such as at time $t_1$. In this context, an "inactivity timer" as referred to herein means a component or logic configured to track a duration of time following an occurrence of a most recent activity event. Such an inactivity timer may comprise circuitry and/or a processor controlled by executable instructions to initialize a state comprising the duration of time following the occurrence of the most recent activity event and to advance the state such as in response to a periodic clock signal. It should be understood, however, that these are merely examples of structures that may be used to provide an activity timer, and that claimed subject matter is not limited in this respect. An "activity event" as referred to herein means an event indicative of a demand for a resource. Such an event may comprise, for example, a request of use a receive chain to process a particular signal (e.g., at a particular time or frequency band). It should be understood, however, that this is merely an example of an activity event, and that claimed subject matter is not limited in this respect.

Block 306 may comprise receiving a request, such as at time $t_2$ in FIG. 2, to perform measurement of an aspect of a downlink signal. In this context, a "request" may comprise a signal or message received at a mobile device, originating at the mobile device or from a device external to the mobile device, requesting an action and/or allocation of a resource. In one example, such a request may comprise one or more symbols received in a communication channel from a transmitting device such as a base station. Further in this context, a "downlink signal" as referred to herein means a radio frequency signal transmitted from a transmitting device configured to transmit signals to multiple receiving devices. For example, a base station in a cellular network may transmit a downlink signal to one or more receiving devices in a cell. In one implementation, such a downlink signal may be transmitted in a portion of spectrum allocated for message traffic, control symbols or messages, a PRS or other signal useful in positioning operations, just to provide a few examples. It should be understood, however, that these are merely examples of a downlink signal, and that claimed subject matter is not limited in this respect. Further in this context, "measurement" of an aspect of a signal as referred to herein means detection or determination of one or more aspects of a signal from received signal energy. For example, measurement may comprise detection or determination of timing an encoded symbol in a received signal, time of arrival of a portion of a received signal (e.g., a preamble or particular symbol among a sequence symbols), just to provide a few examples. In one example, a time of arrival of a portion of a received signal may be obtained relative to a clock state maintained at a receiving device.

Block 306 may comprise receiving a request, such as time $t_2$, to perform measurement of an aspect of a downlink signal such as an occasion of a PRS at a receiver device following initiation of an inactivity timer at block 304. Here, such an occasion of a PRS may be specified in terms of a frequency band and time duration in which such a PRS occasion is expected to be received at a mobile device. Responsive to a request received at block 306, block 308 may schedule at least one of multiple receive chains to acquire the downlink signal to satisfy the request received at block 306 while allowing other receive chains to transmission to the lower power state.

According to an embodiment in which a mobile device may employ multiple receive chains (such as in a MIMO system), at block 308 a mobile device may schedule at least one of the receive chains to perform a receiving function (such as measurement or acquisition of a PRS) while allowing other unscheduled receive chains to transition to a lower power state. In this context, a receive chain may be "scheduled" by determining a time duration (e.g., including a starting time and an ending time) during which the receive chain is to be powered and configured to process a particular signal (e.g., a portion of a downlink signal at a particular frequency band). Referring again to the particular example of FIG. 2, in response to an event at time $t_2$, a mobile device may schedule one or more receive chains to perform a receiving task at time $t_3$ while allowing remaining unscheduled receive chains to transition to a lower power state. Following completion of the receiving task scheduled at time $t_3$, the receive chains scheduled to perform the receiving task at time $t_3$.

According to an embodiment, at block 308 a mobile device may schedule (e.g., at time $t_3$) one or more receive chains to perform a receiving task while allowing remaining unscheduled receive chains to transition to a lower power state. According to an embodiment, to schedule some receive chains for processing a PRS occasion while allowing other receive chains to transition to a lower power or sleep state, a mobile device may signal to a serving base station to suspend transmission to receive chains and/or antenna elements that are being transitioned to the lower power or sleep state. Remaining receive chains scheduled to measure a PRS occasion, however, may continue to process downlink message traffic.

In one example, a mobile device may transmit one or more Rank Indicator messages on an uplink communication channel suggesting channel conditions are such that the serving base station configure downlink transmissions for receive chains that are scheduled at block 308 to process a PRS occasion, and not configure downlink transmissions for receive chains transitioned to the lower power or sleep state. Here, a receive chain having a rank reduced according to a Rank Indicator may be transitioned to a lower power or sleep state while receive chains having an unreduced rank may be scheduled to acquire a PRS occasion.

According to an embodiment, an LTE compatible MIMO system of a mobile device may operate in any one of multiple transmission modes (TM1-TM9) based on feedback messages transmitted by the mobile device. For example, based on channel fading conditions and an antenna separation at the mobile device, if a rank determined the by mobile device is higher, this higher rank may be communicated at block 308 to an eNB device in PUCCH/PUSCH symbols. This may determine how message traffic is to be transmitted on different antennas and/or receive chains and how message traffic is to be multiplexed between or among different antenna elements and/or receive chains. At a mobile device implementing MIMO, for example, different receive chains may be used to decode these independent data layers and increase the net throughput. According to an embodiment, a particular Rank indicator may be selected at block 308 so as to allocate a subset of receive chains (e.g., two out of four available receive chains) for acquiring a PRS while allowing unallocated receive chains to transition to a lower power state.

To enable an increased data throughput and improved network efficiency, an LTE system serving a mobile device employing a MIMO antenna system may implement DLCA by transmitting multiple LTE carriers simultaneously. In an example configuration, a primary component carrier (PCC) may be complemented with one or several secondary component carriers (SCC). The PCC may handle control signaling while one or more SCCs may be used to increase data throughput. The PCC and SCCs may be implemented in various modes including frequency division duplexing (FDD), time division duplexing (TDD) or a mixture of FDD and TDD with location in one or multiple frequency bands.

According to an embodiment, a rank expressed as a rank indicator may specify a particular combination of PCC and SCCs in a DLCA configuration. In a particular implementation, a mobile device comprising an LTE compatible MIMO system may comprise fourteen receive chains for use in processing message traffic in three downlink communication channels employing DLCA with full capability operation. In one embodiment, a PCC configuration (Rank 2) providing 2×2 spatial multiplexing mode may experience a 45% throughput contribution, an SCC 1 configuration (Rank 4) providing a 4×4 spatial multiplexing mode may experience a 25% throughput contribution and configuration SCC 2 (Rank 8) providing an 8×8 spatial multiplexing mode may experience a 30% throughput contribution. According to an embodiment, a mobile device may quantify a throughput contribution on a per layer/rank basis. A Rank indicator of a minimum throughput contribution may be determined on a per 2×2 basis. Here, throughput of a carrier operating in an n×n MIMO mode may be quantified on a per 2×2 rank basis. For example, if a carrier in a 4×4 mode has a throughput of 10 Mbps, throughput may be quantified on a per 2×2 rank basis.

In one scenario, a mobile device may initially be operating in an SCC 2 8×8 spatial multiplexing mode while an inactivity timer is initiated (e.g., at time $t_1$). In response to a subsequent event (e.g., request to measure a PRS at time $t_2$), the mobile device may transmit messages in an uplink communication channel to reduce a Rank Indicator (RI) by reporting a rank of six, putting the MIMO system in a 6×6 mode. Two relinquished receive chains may be allocated to acquiring a PRS while remaining six receive chains may be allowed by transition to a lower power mode (e.g., at time $t_4$). The two relinquished receive chains may then be allowed to transition to a lower power state upon completion of measuring the PRS.

It should be understood that reduction in rank of eight (8×8) to six (6×6) may be performed in any one of several combinations. According to an embodiment, a combination of two of eight receive chains may be selected for PRS measurement (e.g., at block 308) based on an expected accuracy of measured TOA from acquiring the PRS using the selected combination. Here, different locations of antennas on a mobile device sufficiently spaced apart (e.g., spaced at $\lambda/2$-$5\lambda$, where $\lambda$ is a carrier wavelength) may have an uncorrelated channel response and may experience different fading conditions. Accordingly, a pair of receive chains associated with channel conditions expected to result in a most accurate TOA measurement may be selected.

Figure 4:
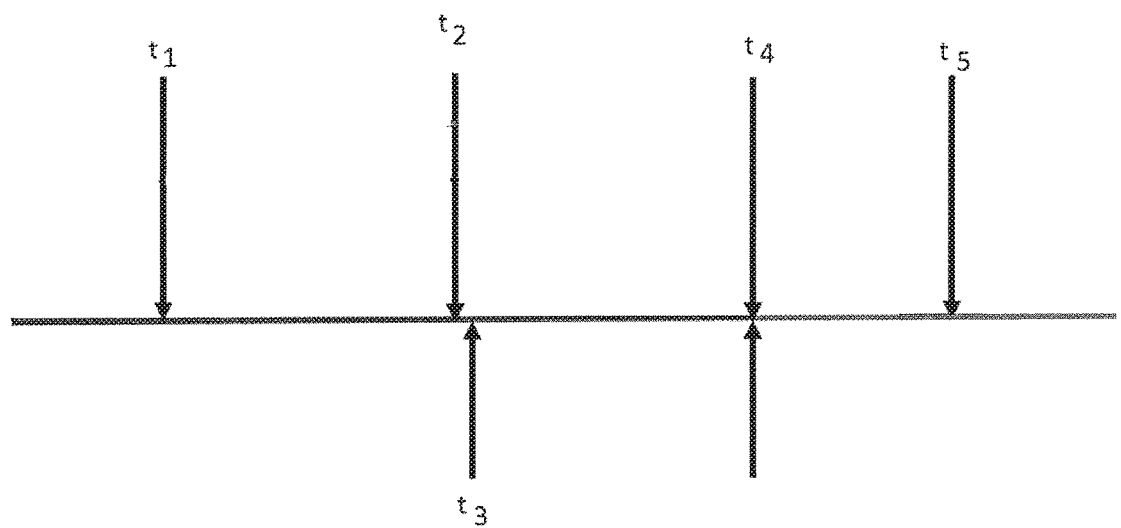
FIG. 4 is a timing diagram illustrating a process to transition a receive chain between power states according to an embodiment.

FIG. 4 is a timing diagram illustrating events including measurement of an aspect of a terrestrial positioning signal responsive to a request. In this particular example, a mobile device may be capable of transitioning one or more portions of its receiver to a lower power state as in a connected DRX (C-DRX) mode. As described above in connection with the process of FIG. 2, an inactivity timer may be initiated at time $t_1$ for transition of one or more received chains to a lower power state at time $t_4$ with an intervening receipt of a request to measure an aspect of a downlink signal at time $t_2$. In this particular implementation, however, the mobile device at time $t_3$ may initiate a second timer for an event at time $t_5$ to transition one or more receive chains of the mobile device from the lower power state to a higher power state (e.g., full power state) to measure an aspect of a downlink signal as per the request received at time $t_2$. Upon expiration of the second timer at time $t_5$, one or more receive chains transitioned to the lower power state at time t4 may be transitioned to the higher power state to measure an aspect of a downlink signal. In one implementation, the mobile device may determine time $t_5$ as being at or about a start of a PRS occasion to be measured according to the request received at time $t_2$.

Figure 5:
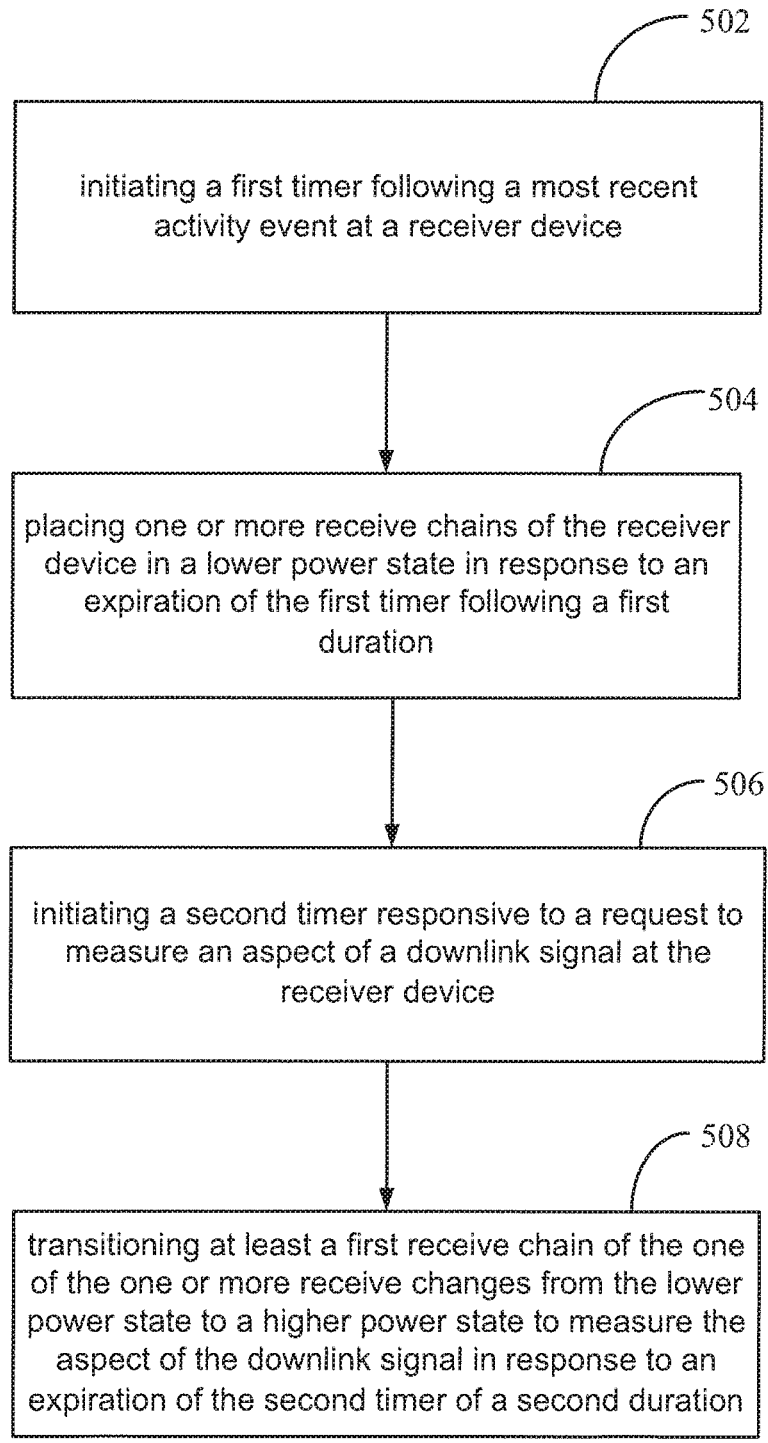
FIGS. 5 and 6 are flow diagrams of processes according to particular example embodiments.

FIG. 5 is a flow diagram of a process that may be implemented at a mobile device according to the particular example embodiment illustrated above with reference to the timing diagram of FIG. 4. Block 502 may comprise initiating a first timer, such as initiating an inactivity timer, following a most recent activity event, such as an activity event occurring at time $t_1$. Such a first timer may comprise, for example, a C-DRX inactivity timer. Block 504 may comprise placing one or more receive chains of a receiver of the mobile device in a lower power state such as at time $t_4$ upon expiration of an inactivity timer. Block 506 may comprise initiating a second timer, such as at time $t_3$, responsive to a request to measure an aspect of a downlink signal, such as a request received at time $t_2$. The second timer may be initialized to expire following a duration at or about a start of a PRS occasion to be measured responsive to the request received at time $t_2$.

Action at block 508 may be initiated responsive to expiration of the second timer initiated at block 506. In an example, one or more receive chains may be placed in a lower power state at block 504. Block 508 may comprise transitioning one or more receive chains from the lower power state to a higher power state at time $t_5$ for measurement of an aspect of a downlink signal such as measurement of a PRS occasion beginning at or about time $t_5$. Following measurement of the aspect of the downlink signal as per the request received at time $t_2$, receive chains transitioned to the higher power state at block 508 may, once again, be placed in the low power state.

Also, in a particular implementation of the process of FIG. 5, receiver of a mobile device may comprise a plurality of receive chains connected to a MIMO antenna system. Here, block 504 may transition the plurality of receive chains in the lower power state. Block 508 may then comprise transitioning one or more of the plurality of receive chains to the higher power state while maintaining other receive chains of the plurality of receive chains in the lower power state. In another implementation, in addition to transitioning at least a first receive chain to a higher power state at block 508, a mobile device may transmit a Rank Indicator Message on an uplink communication channel indicating reduction in the MIMO antenna system rank. Here, the reduced rank may suspend message traffic in downlink signals to the first receive chain while the first receive chain is in the higher power state to measure the aspect of the downlink signal.

Signals acquired at multiple receive chains scheduled at block 308 or block 508 may be processed so as to reduce, eliminate or mitigate multipath in PRS occasions processed by a receiver of a mobile device. According to an embodiment, in the presence of some physical environment elements, a PRS transmitted in a downlink signal may be received at a mobile device in a line-of-sight (LOS) component and one or more reflected/delayed multipath components. A MIMO antenna system having antenna elements with sufficient physical separation to receive portions of a PRS uncorrelated from the effects of noise, etc. enable acquisition/detection of different components of a PRS occasion (e.g., LOS and multipath components of a PRS occasion) transmitted in a downlink signal. For example, a first antenna element of a MIMO antenna system (and an associated receive chain at a receiver) may acquire/detect a multipath component of the PRS occasion while a second antenna element of the MIMO antenna system (and associated receive chain) may acquire/detect an LOS component of the PRS occasion. Here, a measured time of arrival (TOA) of the PRS occasion based on the LOS component received at the first antenna element (e.g., the "true" component of the PRS occasion) may be shorter/sooner than a measured TOA of the PRS occasion based on the multipath component received at the second antenna element.

Figure 6:
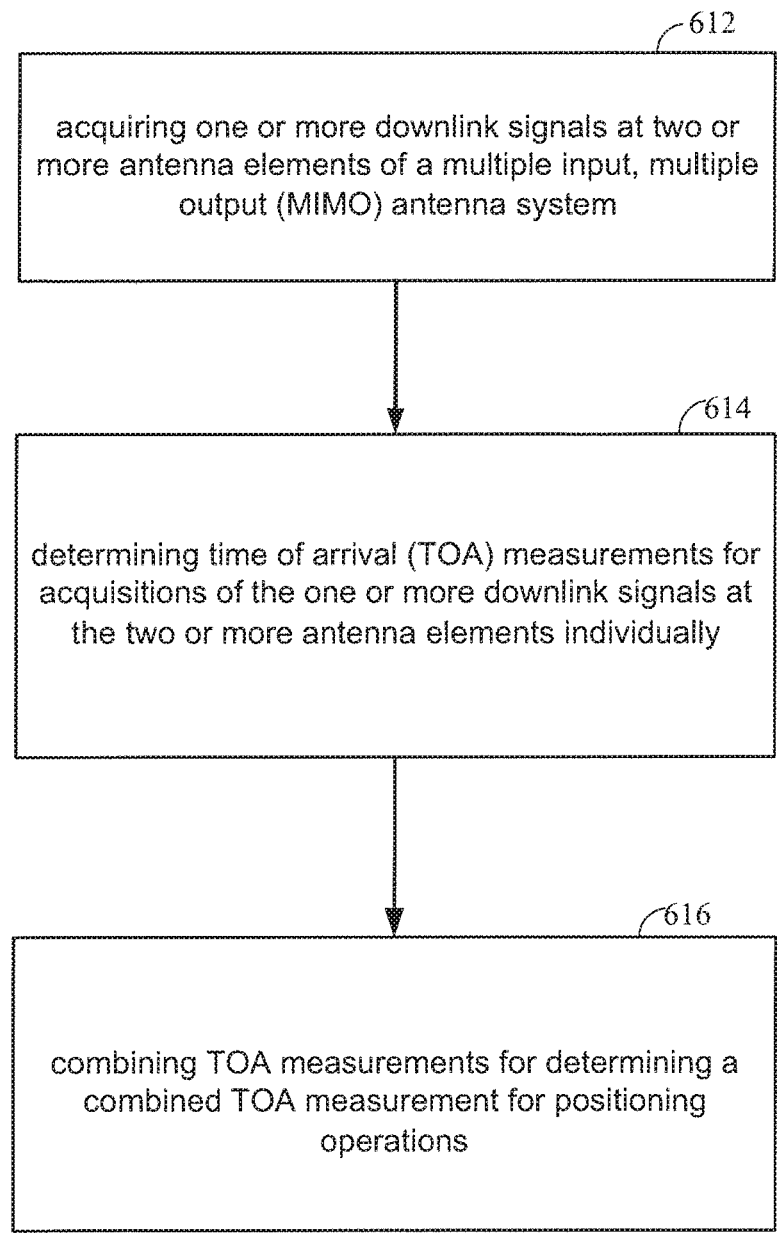

FIG. 6 is a flow diagram of a process to obtain TOA measurements based on signals received at a MIMO antenna system implemented at a mobile device. In this context, a "MIMO antenna system" as referred to herein means multiple antenna elements at a device configurable to transmit different signals on corresponding different antenna elements or receive different signals on corresponding different antenna elements. In an example implementation, the process at FIG. 6 may be performed by a mobile device using signals acquired at receive chains scheduled at block 308 (in the process shown at FIG. 3), or in a particular embodiment with multiple receive chains in connection with block 508 (in the process shown at FIG. 5). Here, a mobile device at block 612 may acquire one or more PRS occasions of a PRS at two or more antenna elements of a MIMO antenna system. Based, at least in part, on signal detections at block 612, a mobile device at block 614 may determine TOA measurements (e.g., relative to a system clock maintained at the mobile device).

According to an embodiment, upon determining TOA measurements for acquisitions of one or more PRS occasions at two or more antenna elements of a MIMO antenna system at block 614, a mobile device at block 616 may combine the TOA measurements obtained at block 614 for determining a combined TOA measurement for positioning operations (e.g., for OTDOA positioning operations). In one implementation, the mobile device may combine TOA measurements by computing a weighted average of the TOA measurements individually obtained at the two or more antenna elements. In another implementation, the mobile device may combine the TOA measurements by selecting a TOA measurement from among the TOA measurements individually obtained at the two or more antenna elements having a shortest TOA. Here, the selected TOA measurement may be deemed to most like be obtained from an LOS component of the PRS occasion.

According to an embodiment, a mobile device at block 612 may employ different receive chains for processing PRS occasions received individually at different antenna elements of a MIMO antenna system. As such, measured TOAs obtained from different antenna elements of the MIMO antenna system may be further affected by different group delays associated with processing at the different receive chains. Here, selecting a TOA measurement at block 616 from among the TOA measurement individually obtained at the two or more antenna elements having a shortest TOA may further comprise compensating for differences in measured group delay between or among the different receive chains.

In another implementation, a mobile device at block 612 may use different antennas of a MIMO system for acquisition of a PRS in succession. In a simple example case, an Antenna #1 and Antenna #2 of a mobile device may be used to acquire two successive PRS occasions. For example, even PRS occasions may be acquired for measuring TOA on a receive chain including Antenna #1 and odd PRS occasions may be acquired for measuring TOA on a receive chain including Antenna #2. A process at block 316 may compute a weighted average of TOA measurements obtained from acquisition of even PRS occasions on a receive chain including Antenna #1 and compute a weighted average of TOA measurements obtained from acquisition of odd PRS occasions on Antenna #2. Such a weighted average may smooth out stale multipath biases to provide a more accurate TOA measurement. Alternatively, a shortest TOA measurement from among multiple antennas (or as between Antenna #1 and Antenna #2 as in the current example) may be inferred to be obtained from a line of sight component of PRS occasions.

According to an embodiment, techniques described above in connection with FIG. 6 may be employed selectively based on a scenario and/or a particular user case. In one example case, a process of FIG. 6 may be performed after determining an initial position fix and to obtain more accurate subsequent fixes. Techniques described above in connection with the process of FIG. 6 may be particularly advantageous if an operating environment has deep fades and significant multipath fading such that a standard deviation in TOA measurements obtained from different receive chains is large. If antennas of a MIMO system are spaced sufficiently apart so as to have independent channel response, measurements of TOAs on different receive chains may then be largely independent of one another. Hence in dense multipath mobility scenarios, spatial diversity techniques described above may yield a TOA measurement or estimate more representative of an LOS signal path. In one MIMO simulation, a typical delay spread may be ~240 ns~=8 Ts and an inter-antenna arrival delay of 30-40 ns-150 ns~=1-1.5 Ts to ~5 Ts. Improvements in performance may be even more significant for narrow band width PRS signals (e.g., as implemented for a mobile device supporting both wideband and narrow band eMTC standard and the mobile device would measure both wideband and narrowband PRS signals).

Figure 7:
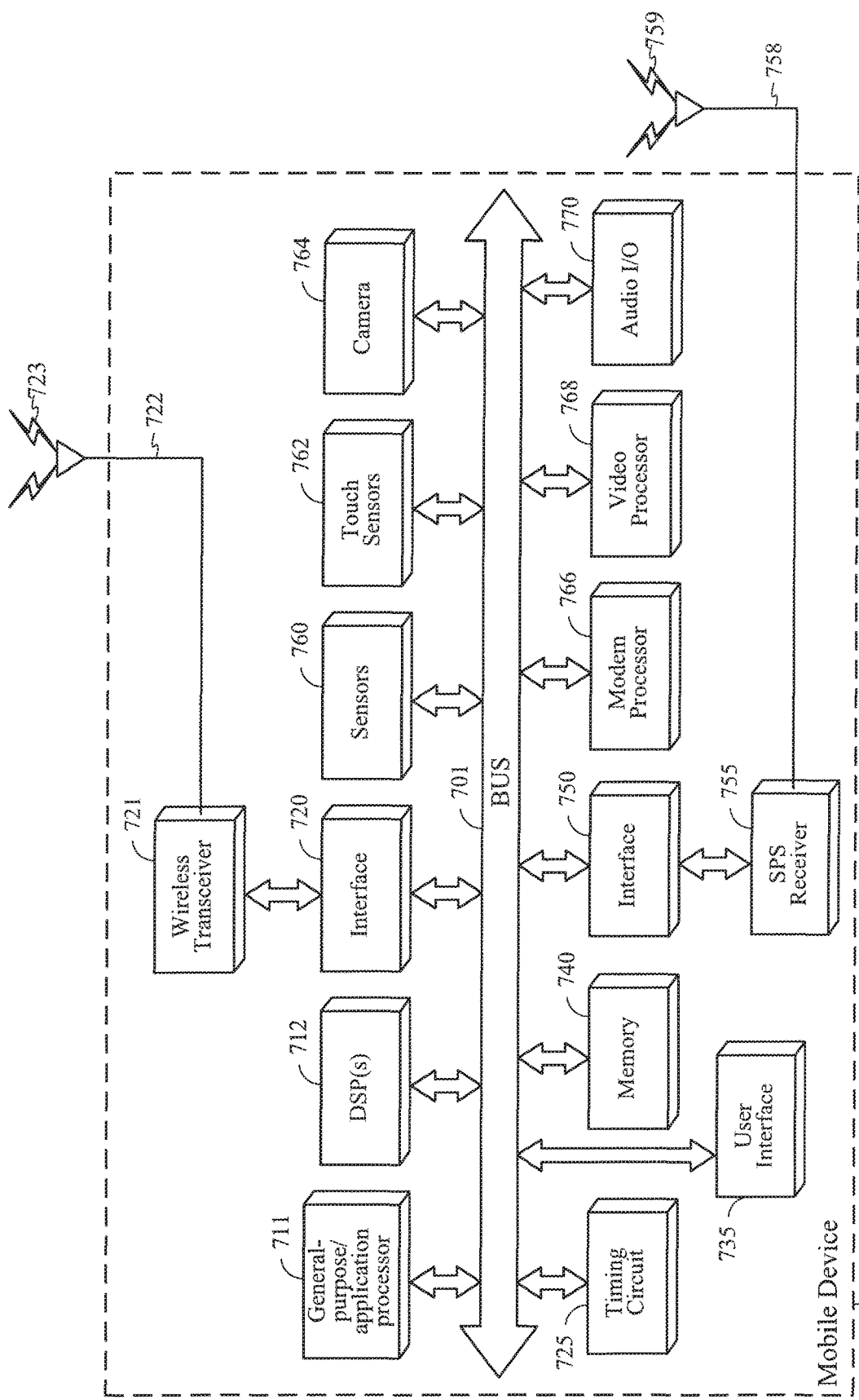
FIG. 7 is a schematic block diagram of a mobile device, in accordance with an example implementation.
Figure 8:
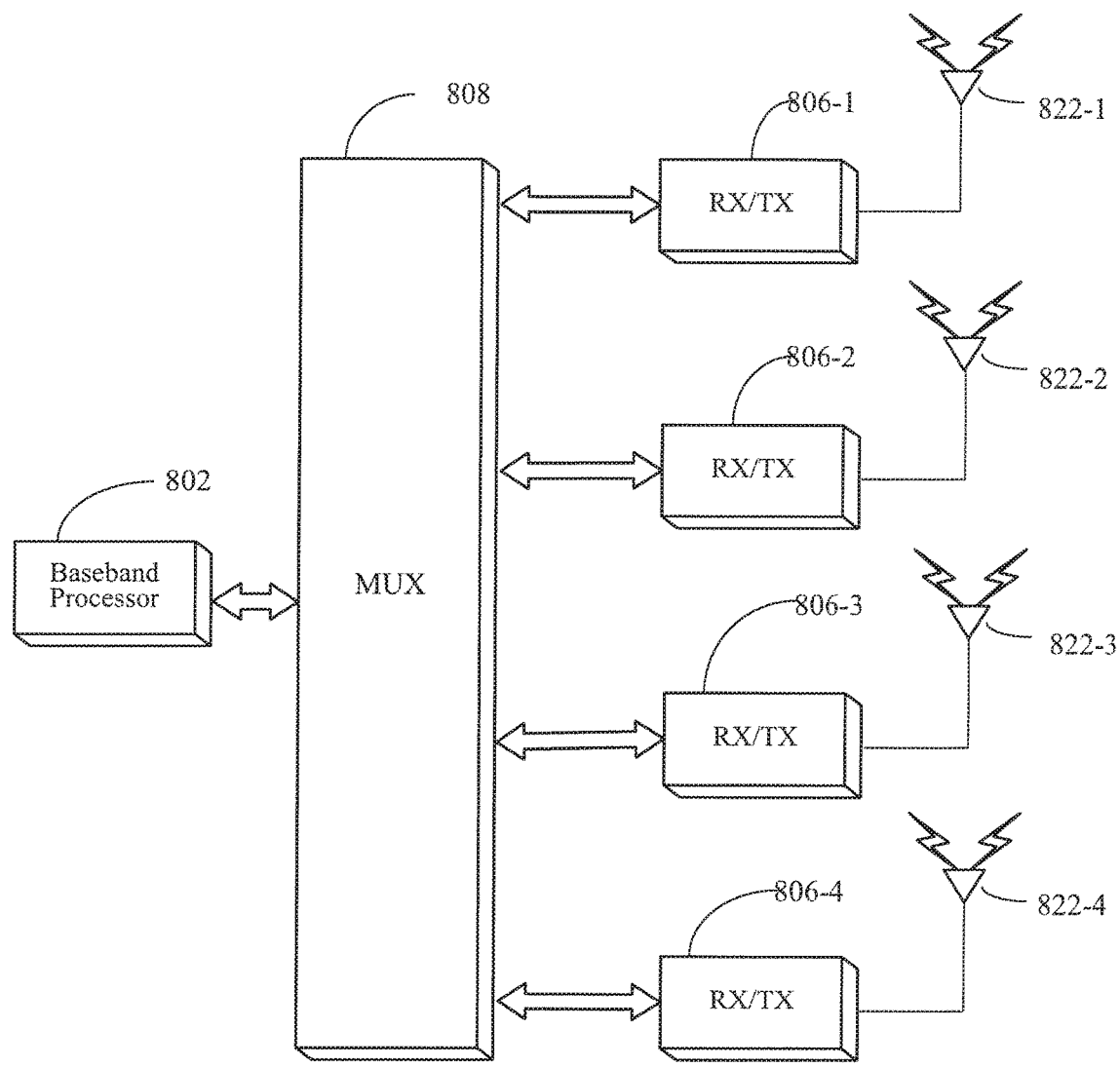
FIG. 8 is a schematic diagram of a multiple input, multiple output transceiver device according to an example implementation.

Subject matter shown in FIGS. 7 and 8 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device," "mobile device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device," "mobile device" and/or similar terms, then, it is intended, pursuant to that statutory section, that corresponding structure, material and/or acts for performing one or more functions be understood and be interpreted to be described at least in FIGS. 3, 5 and 6, and corresponding text of the present disclosure.

FIG. 7 is a schematic diagram of a mobile device 700 according to an embodiment. Mobile device 100 shown in FIG. 1 may comprise one or more features of mobile device 700 shown in FIG. 7. In certain embodiments, mobile device 700 may comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 721 may transmit signals on an uplink channel and receive signals on a downlink channel as discussed above.

Mobile device 700 may also comprise SPS receiver 755 capable of receiving and acquiring SPS signals 759 via SPS antenna 758 (which may be integrated with antenna 722 in some embodiments). SPS receiver 755 may also process, in whole or in part, acquired SPS signals 759 for estimating a location of mobile device 700. In some embodiments, general-purpose processor(s) 711, memory 740, digital signal processor(s) (DSP(s)) 712 and/or specialized processors (not shown) may also be utilized to process acquired SPS signals, in whole or in part, and/or calculate an estimated location of mobile device 700, in conjunction with SPS receiver 755. Storage of SPS or other signals (e.g., signals acquired from wireless transceiver 721) or storage of measurements of these signals for use in performing positioning operations may be performed in memory 740 or registers (not shown). General-purpose processor(s) 711, memory 740, DSP(s) 712 and/or specialized processors may provide or support a location engine for use in processing measurements to estimate a location of mobile device 700. In a particular implementation, all or portions of actions or operations set forth for in FIG. 3, 5 or 6 may be executed by general-purpose processor(s) 711 or DSP(s) 712 based on machine-readable instructions stored in memory 740.

Also shown in FIG. 7, digital signal processor(s) (DSP(s)) 712 and general-purpose processor(s) 711 may be connected to memory 740 through bus 701. A particular bus interface (not shown) may be integrated with the DSP(s) 712, general-purpose processor(s) 711 and memory 740. In various embodiments, functions may be performed in response to execution of one or more machine-readable instructions stored in memory 740 such as on a computer-readable storage medium, such as RAM, ROM, FLASH, or disc drive, just to name a few example. The one or more instructions may be executable by general-purpose processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions or actions described above in connection with FIGS. 3, 5 and 6. In a particular implementation, timing circuit 725 may implement various "timers" such as an inactivity timer as discussed above. For example, timing circuit may advance a clock state responsive to an oscillating signal generated by a crystal oscillator. A timer (e.g., implemented at general-purpose processor(s) 711) may be initialized to a numerical value representing a particular duration of interest. The numerical value may then be decremented responsive to timing circuit 725 until the end of the duration at which point a signal may be generated to at expiration of the duration. Alternatively, a timer may maintain a state that is advanced by timing circuit 725 until a particular state is reached.

Also shown in FIG. 7, a user interface 735 may comprise any one of several devices such as, for example, a speaker, microphone, display device, vibration device, keyboard, touch screen, just to name a few examples. In a particular implementation, user interface 735 may enable a user to interact with one or more applications hosted on mobile device 700. For example, devices of user interface 735 may store analog or digital signals on memory 740 to be further processed by DSP(s) 712 or general purpose processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 700 may comprise touch sensors 762 responsive to touching or pressure on a keyboard or touch screen device.

Mobile device 700 may also comprise a dedicated camera device 764 for capturing still or moving imagery. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 711 or DSP(s) 712. Alternatively, a dedicated video processor 768 may perform conditioning, encoding, compression or manipulation of signals representing captured images. Additionally, video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, camera imagers, microphones, just to name few examples. Sensors 760 may generate analog or digital signals that may be stored in memory 740 and processed by DPS(s) 712 or general purpose application processor 711 in support of one or more applications such as, for example, applications directed to positioning or navigation operations.

In a particular implementation, mobile device 700 may comprise a dedicated modem processor 766 capable of performing baseband processing of signals received and downconverted at wireless transceiver 721 or SPS receiver 755. Similarly, modem processor 766 may perform baseband processing of signals to be upconverted for transmission by wireless transceiver 721. In alternative implementations, instead of having a dedicated modem processor, baseband processing may be performed by a general purpose processor or DSP (e.g., general purpose/application processor 711 or DSP(s) 712). It should be understood, however, that these are merely examples of structures that may perform baseband processing, and that claimed subject matter is not limited in this respect.

FIG. 8 is a schematic diagram of an alternative features of mobile device 700 according to a particular implementation. Here, wireless transceiver 721 may comprise baseband processor 802, multiplexer 808 and transceiver elements 806. Transceiver elements 806 may comprise power circuitry, local oscillators, encoding circuitry and/or filter circuitry that may be configured to upconvert portions of a baseband signal for transmission in an uplink communication channel through antenna elements 822. Transceiver elements 806 may similarly comprise power circuitry, local oscillators, filter circuitry, decoding circuitry and/or detection circuitry that may be configured to downconvert signals received at antenna elements 822 in a downlink communication channel. According to an embodiment, transceiver elements 806 may be connected to respective antenna elements 822 in to form a MIMO antenna system capable of supporting DLCA as discussed above. Here, a transceiver element 806 and corresponding antenna 822 may form a receive chain for acquisition of signals such as an occasion of a PRS as described above. Multiplexer 808 may be used to schedule transmission of symbols formed at baseband processor 802 at individual transceiver elements 806 through respective antenna elements 822.

According to an embodiment, one or a combination of transceiver elements 806 may form a "receiver" or "receive device" capable of measuring or otherwise processing an aspect of a downlink signal. In one particular implementation of processes at FIGS. 3 and 5, receive chains formed by transceiver elements 806-1 and 806-2 in combination with antenna elements 822-1 and 822-2 may be scheduled to acquire a PRS occasion of a PRS at block 308 while receive chains formed by transceiver elements 806-3 and 806-4 in combination with antenna elements 822-3 and 822-4 may be transitioned to a lower power state upon expiration of an activity timer. In an example implementation, receive chains formed by transceiver elements 806-3 and 806-4 in combination with antenna elements 822-3 and 822-4 may be transitioned to a lower power state by, for example, removing power from one or more receiver components in transceiver elements 806-3 and 806-4 (e.g., local oscillators, filter circuitry, decoding circuitry and/or detection circuitry).

In particular implementation of process at FIGS. 3 and 5, one or more PRS occasions of a PRS may be acquired at block 312, independently, on receive chains formed by transceiver elements 806 in combination with respective antenna elements 822. For example, block 314 may determine a first TOA measurement based on acquisition of a PRS occasion at a first receive chain formed by transceiver element 806$_{-1}$ in combination with antenna element 822-1 and determine a second TOA measurement based on acquisition of a PRS occasion at a first receive chain formed by transceiver element 806-2 in combination with antenna element 822-2. These TOA measurements may be combined at block 316 for positioning operations as discussed above.

Particular embodiments discussed herein are directed to a method, at a mobile device, comprising: receiving message traffic at two or more receive chains of a receiver device; initiating an inactivity timer following a most recent activity event at the receiver; receiving a request to perform measurement of an aspect of a downlink signal at the receiver device following initiation of the inactivity timer; and scheduling at least one of the two or more receive chains to measure the aspect of the downlink signal while transitioning other unscheduled receive chains to a lower power state upon expiration of the inactivity timer. In one particular implementation, the method further comprises transitioning the scheduled at least one of the two or more receive chains to the lower power state following measurement of the aspect of the downlink signal. In another particular implementation, the two or more receive chains are connected to a multiple input, multiple output (MIMO) antenna system. In another particular implementation, the method further comprises transmitting a Rank Indicator Message on an uplink communication channel indicating reduction in a rand for the MIMO antenna system, wherein the reduced rank is to suspend message traffic in downlink signals to the other unscheduled receive chains transitioning to the lower power state upon expiration of the inactivity timer. In another particular implementation, the method further comprises: transitioning one or more reduced rank receive chains to the connected DRX mode; and scheduling one or more unreduced rank receive chains for acquisition of the PRS occasion. In another particular implementation, the portion of the downlink signal comprises one or more PRS occasions. In another particular implementation, the lower power state comprises a connected DRX mode. In another particular implementation, the method further comprises: measuring the portion of the downlink signal at two or more antenna elements of a multiple input, multiple output (MIMO) antenna system including the two or more receive chains; determining time of arrival (TOA) measurements for acquisitions of the portion of the downlink signal at the two or more antenna elements individually; and combining TOA measurements for determining a combined TOA measurement for positioning operations. In another implementation, combining TOA measurements for determining the combined TOA measurement for positioning operations further comprises selecting a TOA measurement from among the TOA measurements individually obtained at the two or more antenna elements having a shortest TOA. In another particular implementation, combining TOA measurements for determining the combined TOA measurement for positioning operations further comprises determining a weighted average of the TOA measurements. In another particular implementation, the combined TOA measurements are calibrated based, at least in part, on predetermined group delays associated with the two or more receive chains.

Particular embodiments discussed herein are also directed to a mobile device, comprising: a receiver device comprising two or more receive chains; and one or more processors configured to: initiate an inactivity timer following a most recent activity event at the receiver; detect a request to perform measurement of an aspect of a downlink signal at the receiver device following initiation of the inactivity timer; and schedule at least one of the two or more receive chains to measure the aspect of the downlink signal while transitioning other unscheduled receive chains to a lower power state upon expiration of the inactivity timer. In one particular implementation, the one or more processors are further configured to transition the scheduled at least one of the two or more receive chains to the lower power state following measurement of the aspect of the downlink signal. In another particular implementation, the two or more receive chains are connected to a multiple input, multiple output (MIMO) antenna system. In another particular implementation, the mobile device further comprises a transmitter device and the one or more processors are further configured to initiate transmission of a Rank Indicator Message through the transmitter device on an uplink communication channel indicating reduction in a rand for the MIMO antenna system, wherein the reduced rank is to suspend message traffic in downlink signals to the other unscheduled receive chains transitioning to the lower power state upon expiration of the inactivity timer. In another particular implementation, the one or more processors are further configured to: transition one or more reduced rank receive chains to the connected DRX mode; and schedule one or more unreduced rank receive chains for acquisition of the PRS occasion. In another particular implementation, the portion of the downlink signal comprises one or more PRS occasions. In another particular implementation, the lower power state comprises a connected DRX mode. In another particular implementation, the one or more processors are further configured to: measure the aspect of the downlink signal at two or more antenna elements of a multiple input, multiple output (MIMO) antenna system including the two or more receive chains; determine time of arrival (TOA) measurements for acquisitions of the aspect of the downlink signal at the two or more antenna elements individually; and combine TOA measurements for determining a combined TOA measurement for positioning operations. In another implementation, the one or more processors are further configured to combine TOA measurements for determining the combined TOA measurement for positioning operations by selecting a TOA measurement from among the TOA measurements individually obtained at the two or more antenna elements having a shortest TOA. In another particular implementation, the one or more processors are further configured to combine TOA measurements for determination of the combined TOA measurement for positioning operations based, at least in part, on a determination of a weighted average of the TOA measurements. In another particular implementation, the combined TOA measurements are calibrated based, at least in part, on predetermined group delays associated with the two or more receive chains.

Particular embodiments discussed herein are also directed to a non-transitory storage medium comprising computer-readable instructions stored thereon which are executable by a processor of a mobile device to: obtain message traffic received at two or more receive chains of a receiver device; initiate an inactivity timer following a most recent activity event at the receiver device; detect a request to perform measurement of an aspect of a downlink signal at the receiver device following initiation of the inactivity timer; and schedule at least one of the two or more receive chains to measure the aspect of the downlink signal while transitioning other unscheduled receive chains to a lower power state upon expiration of the inactivity timer. In one particular implementation, the instructions are further executable by the processor to transition the scheduled at least one of the two or more receive chains to the lower power state following measurement of the aspect of the downlink signal. In another particular implementation, the two or more receive chains are connected to a multiple input, multiple output (MIMO) antenna system. In another particular implementation, the instructions are further executable by the processor to initiate transmission of a Rank Indicator Message on an uplink communication channel indicating reduction in a rank for the MIMO antenna system, wherein the reduced rank is to suspend message traffic in downlink signals to the other unscheduled receive chains transitioning to the lower power state upon expiration of the inactivity timer. In another particular implementation, the instructions are further executable by the processor to transition one or more reduced rank receive chains to the connected DRX mode; and schedule one or more unreduced rank receive chains for acquisition of the PRS occasion. In another particular implementation, the portion of the downlink signal comprises one or more PRS occasions. In another particular implementation, the lower power state comprises a connected DRX mode. In another particular implementation, the instructions are further executable by the processor to: measure the portion of the downlink signal at two or more antenna elements of a multiple input, multiple output (MIMO) antenna system including the two or more receive chains; determine time of arrival (TOA) measurements for acquisitions of the portion of the downlink signal at the two or more antenna elements individually; and combine TOA measurements for determining a combined TOA measurement for positioning operations. In another implementation, the instructions are further executable to combine TOA measurements for determining the combined TOA measurement for positioning operations based, at least in part, on a TOA measurement selected from among the TOA measurements individually obtained at the two or more antenna elements having a shortest TOA. In another particular implementation, the instructions are further executable to combine TOA measurements for determination of the combined TOA measurement for positioning operations based, at least in part, on a determination of a weighted average of the TOA measurements. In another particular implementation, the combined TOA measurements are calibrated based, at least in part, on predetermined group delays associated with the two or more receive chains.

Particular embodiments discussed herein are also directed to a mobile device, comprising: means for receiving message traffic at two or more receive chains of a receiver device; means for initiating an inactivity timer following a most recent activity event at the receiver; means for receiving a request to perform measurement of an aspect of a downlink signal at the receiver device following initiation of the inactivity timer; and means for scheduling at least one of the two or more receive chains to measure the aspect of the downlink signal while transitioning other unscheduled receive chains to a lower power state upon expiration of the inactivity timer. In one particular implementation, the mobile device further comprises means for transitioning the scheduled at least one of the two or more receive chains to the lower power state following acquisition of the portion of the downlink signal. In another particular implementation, the two or more receive chains are connected to a multiple input, multiple output (MIMO) antenna system. In another particular implementation, the mobile device further comprises means for transmitting a Rank Indicator Message on an uplink communication channel indicating reduction in a rand for the MIMO antenna system, wherein the reduced rank is to suspend message traffic in downlink signals to the other unscheduled receive chains transitioning to the lower power state upon expiration of the inactivity timer. In another particular implementation, the mobile device further comprises: means for transitioning one or more reduced rank receive chains to the connected DRX mode; and means for scheduling one or more unreduced rank receive chains for acquisition of the PRS occasion. In another particular implementation, the portion of the downlink signal comprises one or more PRS occasions. In another particular implementation, the lower power state comprises a connected DRX mode. In another particular implementation, the mobile device further comprises: means for measuring the portion of the downlink signal at two or more antenna elements of a multiple input, multiple output (MIMO) antenna system including the two or more receive chains; means for determining time of arrival (TOA) measurements for acquisitions of the portion of the downlink signal at the two or more antenna elements individually; and means for combining TOA measurements for determining a combined TOA measurement for positioning operations. In another implementation, the means for combining TOA measurements for determining the combined TOA measurement for positioning operations further comprises means for selecting a TOA measurement from among the TOA measurements individually obtained at the two or more antenna elements having a shortest TOA. In another particular implementation, the means for combining TOA measurements for determining the combined TOA measurement for positioning operations further comprises means for determining a weighted average of the TOA measurements. In another particular implementation, the combined TOA measurements are calibrated based, at least in part, on predetermined group delays associated with the two or more receive chains.

Particular embodiments discussed herein are also directed to a method, at a mobile device, comprising: acquiring one or more downlink signals at two or more antenna elements of a multiple input, multiple output (MIMO) antenna system; determining time of arrival (TOA) measurements for acquisitions of the one or more downlink signals at the two or more antenna elements individually; and combining TOA measurements for determining a combined TOA measurement for positioning operations. In one particular implementation, the one or more downlink signals comprises one or more positioning reference signal (PRS) occasions. In another particular implementation, combining TOA measurements for determining the combined TOA measurement for positioning operations further comprises computing a weighted average of the TOA measurements individually obtained at the two or more antenna elements. In another particular implementation, combining TOA measurements for determining the combined TOA measurement for positioning operations further comprises selecting a TOA measurement from among the TOA measurements individually obtained at the two or more antenna elements having a shortest TOA. In another particular implementation, the one or more downlink signals received individually at the two or more antenna elements are processed in different receive chains for obtaining the TOA measurements individually obtained at the two or more antenna elements. In another particular implementation, selecting the TOA measurement from among the TOA measurement individually obtained at the two or more antenna elements having a shortest TOA comprises compensating for differences in measured group delay between or among different receive chains.

Particular embodiments discussed herein are also directed to a mobile device, comprising: a receiver device comprising a plurality of receive chains coupled to a multiple input, multiple output (MIMO) antenna system; and one or more processors configured to: determine time of arrival (TOA) measurements for acquisitions of the one or more downlink signals at the two or more antenna elements individually; and combine TOA measurements for determining a combined TOA measurement for positioning operations. In one particular implementation, the one or more downlink signals comprise one or more positioning reference signal (PRS) occasions. In another particular implementation, the one or more processors are further configured to combine TOA measurements for determining the combined TOA measurement for positioning operations based, at least in part, on computation of a weighted average of the TOA measurements individually obtained at the two or more antenna elements. In another particular implementation, the one or more processors are further configured to combine TOA measurements for determining the combined TOA measurement for positioning operations based, at least in part, on selection of a TOA measurement from among the TOA measurements individually obtained at the two or more antenna elements having a shortest TOA. In another particular implementation, the one or more downlink signals received individually at the two or more antenna elements are processed in different receive chains for obtaining the TOA measurements individually obtained at the two or more antenna elements. In another particular implementation, the one or more processors are further configured to select the TOA measurement from among the TOA measurement individually obtained at the two or more antenna elements having a shortest TOA based, at least in part, on differences in measured group delay between or among different receive chains.

Particular embodiments discussed herein are also directed to a non-transitory storage medium comprising computer-readable instructions stored thereon which are executable by a processor of a mobile device to: determine time of arrival (TOA) measurements for one or more downlink signals acquired individually at two or more antenna elements of a multiple input, multiple output (MIMO) antenna system; and combine TOA measurements for determining a combined TOA measurement for positioning operations. In one particular implementation, the one or more downlink signals comprises one or more positioning reference signal (PRS) occasions. In another particular implementation, the instructions are further executable by the processor to combine TOA measurements for determining the combined TOA measurement for positioning operations further based, at least in part, on computation of a weighted average of the TOA measurements individually obtained at the two or more antenna elements. In another particular implementation, the instructions are further executable by the process or to combine TOA measurements for determining the combined TOA measurement for positioning operations based, at least in part, on selection of a TOA measurement from among the TOA measurements individually obtained at the two or more antenna elements having a shortest TOA. In another particular implementation, the one or more downlink signals received individually at the two or more antenna elements are processed in different receive chains for obtaining the TOA measurements individually obtained at the two or more antenna elements. In another particular implementation, the instructions are further executable by the processor to select the TOA measurement from among the TOA measurement individually obtained at the two or more antenna elements having a shortest TOA comprises compensating for differences in measured group delay between or among different receive chains.

Particular embodiments discussed herein are also directed to a mobile device comprising: means for acquiring one or more downlink signals at two or more antenna elements of a multiple input, multiple output (MIMO) antenna system; means for determining time of arrival (TOA) measurements for acquisitions of the one or more downlink signals at the two or more antenna elements individually; and means for combining TOA measurements for determining a combined TOA measurement for positioning operations. In one particular implementation, the one or more downlink signals comprises one or more positioning reference signal (PRS) occasions. In another particular implementation, the mobile device further comprises means for combining TOA measurements for determining the combined TOA measurement for positioning operations further comprises computing a weighted average of the TOA measurements individually obtained at the two or more antenna elements. In another particular implementation, the means for combining TOA measurements for determining the combined TOA measurement for positioning operations further comprises means for selecting a TOA measurement from among the TOA measurements individually obtained at the two or more antenna elements having a shortest TOA. In another particular implementation, the one or more downlink signals received individually at the two or more antenna elements are processed in different receive chains for obtaining the TOA measurements individually obtained at the two or more antenna elements. In another particular implementation, the means for selecting the TOA measurement from among the TOA measurement individually obtained at the two or more antenna elements having a shortest TOA comprises means for compensating for differences in measured group delay between or among different receive chains.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
    initiating a first timer following a most recent activity event at a receiver device;
    placing one or more receive chains of the receiver in a lower power state in response to an expiration of the first timer following a first duration, wherein the one or more receive chains comprise a plurality of receive chains connected to a multiple input, multiple output (MIMO) antenna system;
    initiating a second timer responsive to a request to measure an aspect of a downlink signal at the receiver device;
    transitioning at least a first receive chain of the one or more receive chains from the lower power state to a higher power state to measure the aspect of the downlink signal in response to an expiration of the second timer of a second duration; and
    transmitting a Rank Indicator Message on an uplink communication channel indicating reduction in a MIMO antenna system rank, wherein the reduction in the rank of the MIMO antenna system is to suspend message traffic in downlink signals to at least the first receive chain while the first receive chain is in the higher power state.

2. The method of claim 1, wherein the aspect of the downlink signal comprises an occasion of a positioning reference signal (PRS), and wherein the second duration terminates in response to a start of the occasion of the PRS.

3. The method of claim 1, wherein the one or more receive chains comprise a plurality of receive chains connected to a multiple input, multiple output (MIMO) antenna system.

4. The method of claim 3, and further comprising maintaining at least one of the plurality of receive chains in the lower power state in response to the expiration of the second timer following the second duration.

5. The method of claim 1, wherein the lower power state comprises a connected DRX mode.

6. The method of claim 1, and further comprising placing the at least one of the one or more receive chains in the lower power state following measurement of the aspect of the downlink signal.

7. The method of claim 1, and further comprising:
    measuring the aspect of the downlink signal at two or more antenna elements of a multiple input, multiple output (MIMO) antenna system including the one or more receive chains;
    determining time of arrival (TOA) measurements for acquisitions of the aspect of the downlink signal at the two or more antenna elements individually; and
    determining a representative TOA measurement for positioning operations based on the TOA measurements.

8. The method of claim 7, wherein the representative TOA measurement further comprises selecting a TOA measurement from among the TOA measurements individually obtained at the two or more antenna elements having a shortest TOA.

9. The method of claim 1, wherein the first timer comprises a C-DRX inactivity timer.

10. The method of claim 1, and further comprising maintaining at least a second receive chain of the plurality of receive chains in the lower power state while transitioning the first receive chain to the higher power state in response to the expiration of the second timer following the second duration.

11. A mobile device, comprising:
    a receiver device comprising one or more receive chains, wherein the one or more receive chains comprise a plurality of receive chains connected to a multiple input, multiple output (MIMO) antenna system;
    a transmitter device; and
    one or more processors communicatively coupled to the receiver device and the transmitter device, configured to:
    initiate a first timer following a most recent activity event at the receiver device;
    place the one or more receive chains of the receiver device in a lower power state in response to an expiration of the first timer following a first duration;
    initiate a second timer responsive to a request to measure an aspect of a downlink signal at the receiver device; and
    transition at least a first receive chain of the one or more receive chains from the lower power state to a higher power state to measure the aspect of the downlink signal in response to an expiration of the second timer of a second duration; and
    initiate transmission, on the transmitter device, of a Rank Indicator Message on an uplink communication channel indicating reduction in a MIMO antenna system rank, wherein the reduction in the MIMO antenna system rank is to suspend message traffic in downlink signals to at least the first receive chain while the first receive chain is in the higher power state.

12. The mobile device of claim 11, wherein the aspect of the downlink signal comprises an occasion of a positioning reference signal (PRS), and wherein the second duration terminates in response to a start of the occasion of the PRS.

13. The mobile device of claim 11, wherein the one or more receive chains comprise a plurality of receive chains connected to a multiple input, multiple output (MIMO) antenna system.

14. The mobile device of claim 13, wherein the one or more processors are further configured to maintain at least one of the plurality of receive chains in the lower power state in response to the expiration of the second timer following the second duration.

15. The mobile device of claim 11, wherein the lower power state comprises a connected DRX mode.

16. The mobile device of claim 11, wherein the one or more processors are further configured to place the at least one of the one or more receive chains in the lower power state following measurement of the aspect of the downlink signal.

17. The mobile device of claim 11, wherein the one or more processors are further configured to:
measure the aspect of the downlink signal at two or more antenna elements of a multiple input, multiple output (MIMO) antenna system including the one or more receive chains;
determine time of arrival (TOA) measurements for acquisitions of the aspect of the downlink signal at the two or more antenna elements individually; and
determine a representative TOA measurement for positioning operations based on the TOA measurements.

18. The mobile device of claim 17, wherein the one or more processors are further configured to determine the representative TOA measurement for positioning operations based, at least in part, on selection of a TOA measurement from among the TOA measurements individually obtained at the two or more antenna elements having a shortest TOA.

19. The mobile device of claim 11, wherein the first timer comprises a C-DRX inactivity timer.

20. The mobile device of claim 11, wherein the one or more processors are further configured to maintain at least a second receive chain of the plurality of receive chains in the lower power state while transitioning the first receive chain to the higher power state in response to the expiration of the second timer following the second duration.

21. A non-transitory storage medium comprising computer-readable instructions stored thereon which are executable by a processor of a mobile device to:
initiate a first timer following a most recent activity event at a receiver device of the mobile device;
place one or more receive chains of the receiver device in a lower power state in response to an expiration of the first timer following a first duration, wherein the one or more receive chains comprise a plurality of receive chains connected to a multiple input, multiple output (MIMO) antenna system;
initiate a second timer responsive to a request to measure an aspect of a downlink signal at the receiver device;
transition at least a first receive chain of the one or more receive chains from the lower power state to a higher power state to measure the aspect of the downlink signal in response to an expiration of the second timer of a second duration; and
transmit a Rank Indicator Message on an uplink communication channel indicating reduction in a MIMO antenna system rank, wherein the reduction in the rank of the MIMO antenna system is to suspend message traffic in downlink signals to at least the first receive chain while the first receive chain is in the higher power state.

22. The non-transitory storage medium of claim 21, wherein the one or more receive chains comprise a plurality of receive chains connected to a multiple input, multiple output (MIMO) antenna system, and wherein the computer-readable instructions are further executable by the processor to maintain at least one of the plurality of receive chains in the lower power state at the expiration of the second timer of the second duration.

23. The non-transitory storage medium of claim 21, wherein the computer-readable instructions are further executable by the processor to place the at least one of the one or more receive chains in the lower power state following measurement of the aspect of the downlink signal.

24. The non-transitory storage medium of claim 21, wherein the computer-readable instructions are further executable to:
measure the aspect of the downlink signal at two or more antenna elements of a multiple input, multiple output (MIMO) antenna system including the one or more receive chains;
determine time of arrival (TOA) measurements for acquisitions of the aspect of the downlink signal at the two or more antenna elements individually; and
determine a representative TOA measurement for positioning operations based on the TOA measurements.

25. A mobile device, comprising:
means for initiating a first timer following a most recent activity event at a receiver device;
means for placing one or more receive chains of the receiver in a lower power state in response to an expiration of the first timer following a first duration, wherein the one or more receive chains comprise a plurality of receive chains connected to a multiple input, multiple output (MIMO) antenna system;
means for initiating a second timer responsive to a request to measure an aspect of a downlink signal at the receiver device;
means for transitioning at least a first receive chain of the one or more receive changes from the lower power state to a higher power state to measure the aspect of the downlink signal in response to an expiration of the second timer of a second duration; and
means for transmitting a Rank Indicator Message on an uplink communication channel indicating reduction in a MIMO antenna system rank, wherein the reduction in the MIMO antenna system rank is to suspend message traffic in downlink signals to at least the first receive chain while the first receive chain is in the higher power state.

26. The mobile device of claim 25, and further comprising means for placing the at least one of the one or more receive chains in the lower power state following measurement of the aspect of the downlink signal.

27. The mobile device of claim 25, and further comprising means for maintaining at least a second receive chain of the plurality of receive chains in the lower power state while transitioning the first receive chain to the higher power state in response to the expiration of the second timer of the second duration.

* * * * *